(12) United States Patent
Ito et al.

(10) Patent No.: US 7,667,047 B2
(45) Date of Patent: Feb. 23, 2010

(54) COLORANT

(75) Inventors: Yuka Ito, Kanagawa (JP); Shinji Hasegawa, Kanagawa (JP); Minquan Tian, Kanagawa (JP); Miho Watanabe, Kanagawa (JP); Kazuhiko Hirokawa, Kanagawa (JP); Kazunori Anazawa, Kanagawa (JP); Tomoko Miyahara, Kanagawa (JP); Takashi Matsubara, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/244,103

(22) Filed: Oct. 2, 2008

(65) Prior Publication Data
US 2009/0247769 A1 Oct. 1, 2009

(30) Foreign Application Priority Data
Mar. 26, 2008 (JP) .............................. 2008-081322

(51) Int. Cl.
*C07D 207/44* (2006.01)
*G03G 9/09* (2006.01)

(52) U.S. Cl. .................... 548/518; 430/105; 430/97; 430/37; 430/32

(58) Field of Classification Search ................. 548/518; 430/32, 37, 97, 105
See application file for complete search history.

(56) References Cited

U.S. PATENT DOCUMENTS

2004/0255821 A1 12/2004 Mizuguchi et al.

2005/0016420 A1 1/2005 Mizuguchi et al.

FOREIGN PATENT DOCUMENTS

| JP | 2003-41144 A | 2/2003 |
| JP | 2003-41145 A | 2/2003 |
| WO | WO 03079339 A1 * | 9/2003 |

OTHER PUBLICATIONS

Yuki Ganryo Handbook-Color Office, 2006, Organic Pigments Handbook, pp. 613-617.

* cited by examiner

*Primary Examiner*—Rebecca L Anderson
*Assistant Examiner*—Jason Nolan
(74) *Attorney, Agent, or Firm*—Sughrue Mion, PLLC

(57) ABSTRACT

A colorant contains a crystal of a compound represented by the following formula (1):

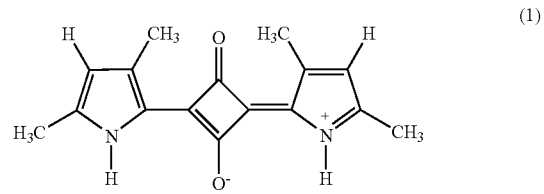

the crystal having a crystal form showing main peaks at interplanar spacings d of 3.45±0.5 Å, 3.63±0.5 Å, 4.23±0.5 Å, 6.65±0.5 Å, and 7.84±0.5 Å in powder X-ray diffraction pattern with CuKα radiation.

3 Claims, 5 Drawing Sheets

COLORANT

CROSS-REFERENCE TO RELATED APPLICATIONS

This application is based on and claims priority under 35 USC 119 from Japanese Patent Application No. 2008-081322 filed on Mar. 26, 2008.

BACKGROUND

1. Technical Field

This invention relates to a colorant.

2. Related Art

Black colorants known for use in information recording materials such as electrophotographic toners and inkjet inks include carbon black, aniline black, black iron oxide, and black titanium oxide. In this regard, *Yuki Ganryo Handbook—Color Office,* 2006 can be referred to. These black colorants also find use as a component for imparting black color or light shielding properties in the manufacture of black light-shielding glass, black matrix materials of plasma displays or liquid crystal displays, agricultural light-shielding films, and so forth.

Improvement on colorants and development of colorants with an added function have been conducted extensively. So far proposed colorants with an added function include those which look black but, unlike carbon black, do not absorb infrared light. Such colorants are exemplified by a subtractive mixture of cyan, magenta, and yellow pigments (hereinafter referred to as CMY composite black) and a black perylene-based pigment such as the pigments proposed in JP-A-2003-41144 and JP-A-2003-41145, which are obtained by firing a specific compound (hereinafter simply referred to as a black perylene pigment).

SUMMARY

According to an aspect of the invention, there is provided a colorant containing crystals of a compound represented by formula (1):

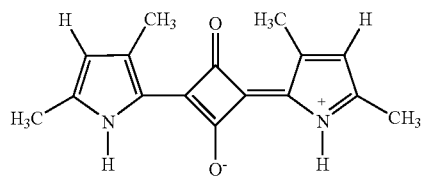

The compound of formula (1) (hereinafter simply referred to as the compound (1)) has a crystal form showing main peaks at interplanar spacings d of 3.45±0.5 Å (Angstrom), 3.63±0.5 Å, 4.23±0.5 Å, 6.65±0.5 Å, and 7.84±0.5 Å in powder X ray diffraction pattern (CuKα radiation).

DETAILED DESCRIPTION

Figure 1:
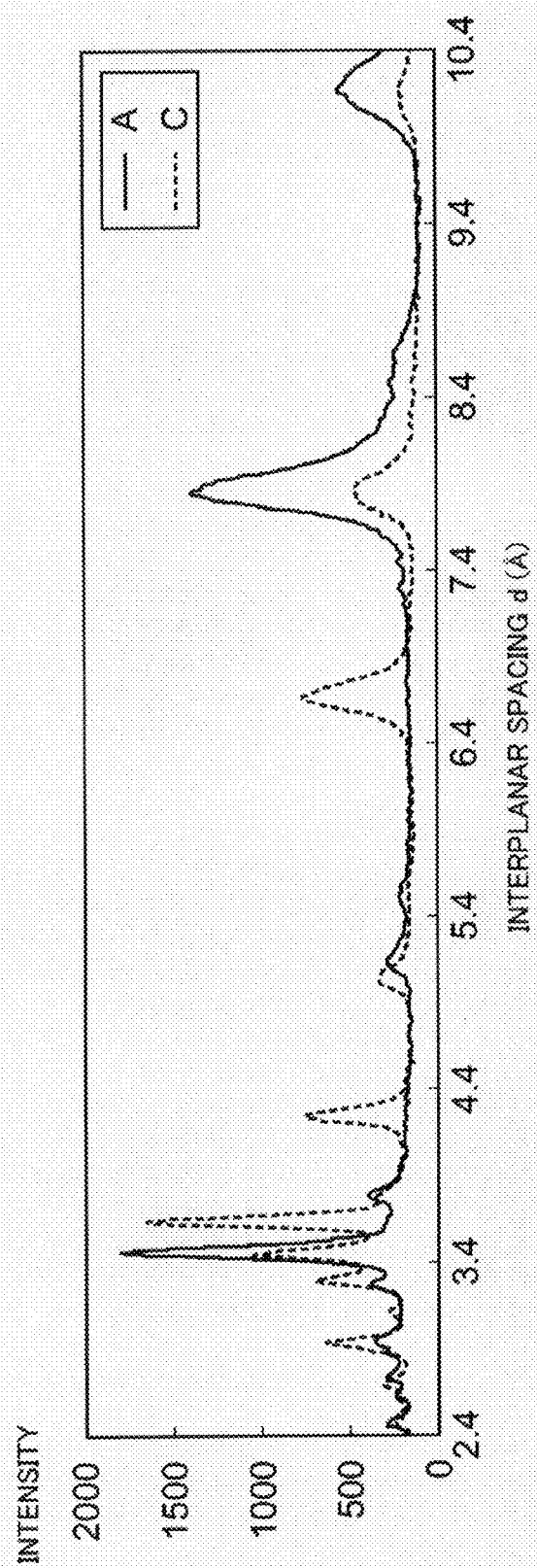
FIG. 1 is the powder X-ray diffraction spectra of crystals A and C.

The colorant of the invention contains crystals of a compound represented by formula (1):

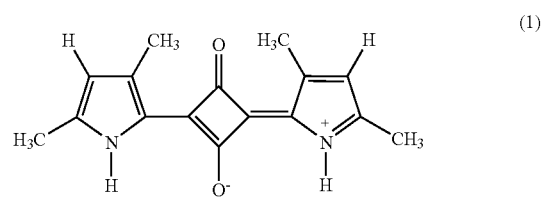

The crystal has a crystal form showing main peaks at interplanar spacings d of 3.45±0.5 Å, 3.63±0.5 Å, 4.23±0.5 Å, 6.65±0.5 Å, and 7.84±0.5 Å in powder X ray diffraction pattern (CuKα radiation). The crystal of the compound (1) having the specific crystal form will hereinafter be referred to as crystal (III) (crystal having a crystal phase (III)).

The powder X ray diffraction spectrum using a CuKα radiation is measured using an X ray diffractometer (D8 DISCOVER from Bruker AXS) and an X ray radiation with a wavelength of 1.5405 Å emitted from a Cu target.

The crystal forms of the compound (1) also include a form displaying main peaks at interplanar spacings d of 3.25, 3.46, 3.77, 5.10, and 7.84 Å (hereinafter referred to as crystal (I)). Although the crystal (I) (the crystal having a crystal phase (I)) exhibits near infrared transmissivity and visible light absorptivity, the crystal (III) has higher absorption in the visible region and higher blackness than the crystal (I).

It is preferred for obtaining further improve blackness that the crystal (III) have the ratio of the peak intensity at an interplanar spacing d of 4.23±0.5 Å ($I_{4.23}$) to that at d=3.45±0.5 Å ($I_{3.45}$), i.e., $I_{4.23}/I_{3.45}$, of 1.0 or greater in a powder X ray diffraction pattern (CuKα radiation).

The further improvement in blackness exhibited by the crystals (III) which satisfy the preferred condition recited above is, the inventors consider, attributed to the orientation of the crystals. While the crystal (III) has absorption in the visible region, the absorption wavelength range varies from face to face. The inventors believe that the balance of absorption among the crystal faces largely influences the blackness of the crystal. This belief is predicated on the following findings. The crystal (III) which has $I_{4.23}/I_{3.45}$ of less than 1 is the result of greater growth in other than the direction of the crystal plane having an interplanar spacing d of 4.23 Å and therefore has a skewed shape such as a platy shape. Such a crystal strongly absorbs light around 550 nm but tends to have reduced absorption in the shorter and the longer wavelength ranges than about 550 nm. In contrast, the crystal (III) which has $I_{4.23}/I_{3.45}$ of 1 or greater can have a crystal shape resulting from isotropic growth. Such a crystal is considered to have sufficient light absorbing faces that bring about improved blackness (particularly a crystal face that absorbs light not only at about 550 nm but also in the shorter and longer wavelength ranges than about 550 nm) and therefore exhibits high absorption over abroad range of from 400 nm to 700 nm.

To obtain sufficient blackness based on averaged absorption over a range of 400 to 700 nm, the relative intensity ratio $I_{4.23}/I_{3.45}$ is more preferably 1 to 2.

The crystal (III) can be obtained in the form of particles by, for example, the following process.

A pyrrole compound (i.e., 2,4-dimethylpyrrole) corresponding to the pyrrole substituent of formula (1) and squaric acid are caused to react with each other by heating in an organic solvent (e.g., ethanol) in accordance with the process described in A. Treibs & K. Jacob, *Angewandte Chemie International Edition in English*, Vol. 4, Issue 8, "Cyclotrimethine Dyes Derived from Squaric Acid", (1965), p. 694. The reaction product is dissolved in a hydrophilic organic solvent miscible with water in any mixing ratio (e.g., tetrahydrofuran, diethylamine, acetone, or ethanol).

The resulting solution is introduced into ice-cooled distilled water while stirring using, for example, a syringe to obtain a particulate precipitate. The particle size of the precipitate is adjustable by controlling the concentration of the compound (1) in the solution, the rate of introducing the solution, the amount and temperature of the distilled water, the speed of stirring, and so forth.

The precipitate is collected by filtration, washed with ethanol and distilled water, and dried in vacuo to yield particles containing crude crystals of the compound (1). The particles are dissolved in a prescribed solvent and recrystallized. The resulting purified product is transformed into particles containing the crystals (III) by milling in the presence of a prescribed solvent in a milling apparatus, typified by a bead mill. Examples of the solvent used for recrystallization include isopropyl alcohol (IPA), tetrahydrofuran (THF), ethanol, methanol, acetonitrile, acetone, dimethyl sulfoxide (DMSO), and dimethylformamide (DMF). Examples of the solvent used in the milling include IPA, THF, ethanol, methanol, acetonitrile, acetone, DMSO, and DMF. The milling can be carried out by, for example, using 0.1 to 10 mm diameter beads at 50 to 800 rpm for 0.1 to 200 hours. The solvent for the milling is preferably used in such an amount that dissolves only part of the purified product. It is considered that the crystals are allowed to grow while aligning the molecules along the plane of easy growth by applying a force by the beads while relaxing the molecular bonds in the presence of the solvent of an amount insufficient for dissolving the whole crystals.

The crystals (III) are preferably those obtained by recrystallizing the crude crystals from ethanol, mixing the purified product with THF of an amount capable of dissolving part of the purified product, and recrystallizing the purified product with part of which dissolved in THF. Through these steps are obtained more assuredly the crystals (III) having a relative intensity ratio $I_{4.23}/I_{3.45}$ of 1.0 or greater.

The particles containing the crystals (III) preferably have a particle size ranging from 10 nm to 200 nm. The particles whose size being in the range recited not only have reduced light scattering from their surface thereby to achieve increased color density but also exhibit good dispersion stability in a medium such as water, a vehicle or a polymer in the presence of a dispersant such as an ordinary surface active agent.

When the colorant of the invention is for use in information recording materials, the crystals (III) preferably have a median diameter (d50) of 10 to 200 nm.

The amount of the crystals (III) to be used is preferably at least 80% by mass based on the total colorant to provide more assuredly a colorant transmissive to near infrared light and sufficiently competent to absorb visible light.

The colorant may contain other colorant such as a yellow colorant to further improve the blackness.

The colorant has a broad absorption band in the visible region and shows superior blackness and is therefore useful as a black material, particularly suited as a black material in an image forming material.

Conventional black toners for electrophotographic imaging apparatus such as copiers often contain carbon black as a black pigment. However, use of a large quantity of carbon black adversely affects the charging properties of a toner. On the other hand, CYM composite black or perylene black pigments have lower color densities than carbon black. In contrast, the colorant of the invention substitutes for carbon black because not only it exhibits superior blackness but also has a gram extinction coefficient closer to that of carbon black than other materials. That is, the colorant of the invention enables providing a black toner that is of non- or low-carbon black type and yet sufficiently excellent in color density, which has been difficult with CYM composite black or perylene black pigments. An embodiment of using the colorant of the invention as a component of a black toner will be described infra.

Since the colorant of the invention has a broad absorption band in the visible region and transmissivity to near infrared light, it is useful as a near infrared transmitting black material in the applications exemplified below.

The colorant of the invention is useful in the field of document security. For example, part of text of graphic information is formed with carbon black, while the rest is formed with the colorant of the invention. The whole image formed in this system is perceptible as a normal black image to the human eye, but the part formed with the colorant of the invention, i.e., the near infrared transmitting black material looks transparent when seen through a detector sensitive only to near infrared light. This feature can be made use of in forming a black image having incorporated therein an information code or a hidden letter and therefore highly secured against leakage.

The colorant of the invention is useful as a heat absorption modifier in a toner for flash fusing. When a black toner image containing carbon black and a binder resin is flash fixed using a flash lamp, excessive absorption of heat rays by the black toner can cause an excessive increase of the resin temperature. Therefore, where a cyan, a magenta, a yellow or a like color image is formed on the same paper as the black toner image, it has been difficult to evenly fuse and fix the resin of all the color images. To solve this problem, the colorant of the invention can be added to a black toner for flash fusing to control the heat absorption by the toner without impairing the blackness of the black image. An excessive increase of resin temperature at flash fusing can thus be prevented.

The colorant of the invention is particularly suitable as a heat absorption modifier for use in a black toner for flash fusing containing a polyester resin or a styrene acrylic resin as a binder resin.

The colorant of the invention is also suitable as a black material for coloring a resin part that is configured to be joined to other resin elements by laser transmission welding.

Laser transmission welding is a processing technique for joining resin parts using a laser beam as a heat source. In some detail, a transmissive resin part which transmits a laser beam is superposed on an absorptive resin part that absorbs a laser beam, and the resin parts are irradiated with a laser beam while imposing pressure to the contacting faces of the parts to be joined together. The laser beam is transmitted through the transmissive resin part to the absorptive resin part to generate heat near the interface. The two resin parts are melted by the heat and joined together.

In usual laser transmission welding, dyes have been used as a black colorant to be incorporated into the transmissive resin part because pigments cause a large laser beam loss. When the colorant of the invention is used in place of dyes, in contrast, a black colored transmissive resin part can be produced with sufficient color density and higher color fastness than by dyes without impairing laser beam transmissivity.

The colorant of the invention is useful as a colorant in a shading resin film such as an agricultural light shielding film. An agricultural light shielding film is a black film used to cover the ground so as to control weeds by blocking visible light and to warm the soil by transmitting near infrared and infrared light.

The colorant of the invention is useful as a black pigment that can be used for coloring light control glass, light shielding glass, ink, paints, inkjet ink, rubbers, and plastics and for making black matrices, color filters, and spun-died fibers.

The colorant of the invention can be used in the form of a thin film. A thin film made of the colorant attenuates visible light while transmitting infrared light without causing attenuation. A thin film formed of the colorant is suited for use as an optical filter, and so forth.

A preferred embodiment of the invention in which the colorant is applied to a toner will be described.

The toner of the present embodiment is an electrophotographic toner containing the colorant of the invention, a binder resin, and various optional components that may be added according to necessity, including a colorant other than the colorant of the invention, an infrared absorber, a charge control agent, and a wax.

Any thermoplastic resin, either naturally occurring or synthetic, can be used as a binder resin of the toner. Examples of suitable binder resins include an epoxy resin, a styrene acrylic resin, a polyamide resin, a polyester resin, a polyvinyl resin, a polyolefin resin, a polyurethane resin, a polybutadiene resin, and mixtures thereof. These binder resins preferably have a weight average molecular weight of about 1000 to 100,000 and a melting point of 50° to 250° C. Preferred of the recited binder resins are a styrene acrylic resin and a polyester resin for their colorant dispersing ability and thermal fixing efficiency.

To secure charging characteristics and thermal fixing efficiency, the ratio of the colorant of the invention to the binder resin in the toner is preferably 1 to 15 parts, more preferably 3 to 10 parts, by mass of the former per 100 parts by mass of the latter.

Any colorant, inclusive of a dye and a pigment, may be used in combination of the colorant of the invention. For use in a black toner, for instance, the colorant of the invention may be used in combination with carbon black or CMY composite black.

The amount of the colorant other than that of the invention, if used, is preferably 1% to 15% by mass, more preferably 3% to 10% by mass, based on the total toner composition.

In the case where the toner of the present embodiment is designed for flash fusing, the toner may contain an infrared absorber. Examples of suitable infrared absorbers include aluminum salts, indium oxide-based metal oxides, tin oxide-based metal oxides, zinc oxide-based metal oxides, cadmium stannate, specific amide compounds, naphthalocyanine compounds, phthalocyanine compounds, cyanine compounds, and lanthanoid compounds. Black pigments such as carbon black, titanium black, ferrite, magnetite, and zirconium carbide are also employable as an infrared absorber. They can be used either individually or as a mixture thereof.

Any charge control agent capable of imparting chargeability to the toner may be employable. Suitable examples of positively working charge control agents are quaternary ammonium salts, nigrosine dyes, and triphenylmethane derivatives. Suitable examples of negatively working charge control agents are zinc naphthoate complexes, zinc salicylate complexes, and boron compounds. The charge control agent is added usually in an amount of, while varying depending on the kind, about 1% to 10% by mass based on the total toner composition.

The wax to be added as an optional component can be chosen from a broad range including naturally occurring waxes and synthetic waxes. Examples of naturally occurring waxes include petroleum waxes such as paraffin wax and microcrystalline wax; mineral waxes such as Fischer-Tropsch wax and montan wax; plant waxes such as carnauba wax; and animal waxes such as beeswax and lanoline. Examples of synthetic waxes include polyolefins such as polyethylene and polypropylene, fatty acid esters, amide waxes, modified polyolefins, terpene compounds, and polycaprolactone. These waxes can be used either individually or as a mixture thereof. The amount of the wax to be added, while varying according to the kind, usually ranges from 1% to 10% by mass based on the total toner composition.

An external additive may be added to the toner. A wide range of commonly employed external additives are usable, including inorganic particles such as silica, titanium oxide, alumina, and zinc oxide; the inorganic particles which are hydrophilized; and resin particles such as polystyrene, PMMA, and melamine resins.

The toner of the present embodiment is prepared in the same manner as general toner production processes such as a milling process and polymerization processes.

In a milling process, a binder resin, the colorant of the invention and other necessary components such as a colorant other the colorant of the invention, an infrared absorber, a wax, and a charge control agent are mixed and melt kneaded in a kneader, an extruder, etc. The mixture is crushed, then pulverized in, for example, a jet mill, and passed through an air classifier to obtain toner particles of desired size. An external additive is added thereto to give a final toner.

The polymerization processes include a suspension polymerization process and an emulsion polymerization process. The colorant of the invention is dispersible in water to make an aqueous slurry, i.e., a form suited to the emulsion polymerization process. In this regard, the toner of the present embodiment is preferably a chemical toner prepared by emulsion polymerization.

In the case of suspension polymerization, a monomer mixture is prepared from a monomer such as styrene, butyl acrylate, or 2-ethylhexyl acrylate, a crosslinking agent such as divinylbenzene, a chain transfer agent such as dodecylmercaptan, the colorant of the invention, a polymerization initiator, and other necessary additives such as a colorant other than the colorant of the invention, a charge control agent, an infrared absorber, and a wax. The monomer mixture is poured into an aqueous phase containing a suspension stabilizer such as calcium tertiary phosphate or polyvinyl alcohol and a surface active agent. The reaction system is emulsified using, e.g., a rotor stator emulsifier, a high pressure emulsifier, or an ultrasonic emulsifier, followed by heating to polymerize the monomer. After completion of the polymerization, the particles formed are washed, dried, and supplemented with an external additive to give a final toner.

In the case of emulsion polymerization, a monomer (e.g., styrene, butyl acrylate or 2-ethylhexyl acrylate) and optionally a surface active agent (e.g., sodium dodecylsulfate) are put in water having dissolved therein a water soluble polymerization initiator (e.g., potassium persulfate) and heated while stirring to synthesize resin particles. To the resulting suspension of the resin particles are added particles of an infrared absorber, a wax, and the like, followed by stirring at a controlled pH, a controlled temperature, and a controlled stirring strength thereby to cause hetero aggregation of the particles. The system is heated at or above the glass transition temperature of the resin to fusion bond the aggregates into toner particles. The particles are washed, dried, and supplemented with an external additive to give a final toner. Coloring of the particles is effected by mixing the fusion bonded hetero-aggregates with an aqueous slurry of the colorant of the invention and an optional colorant other than the colorant of the invention and causing coagulation with the aid of a polyvalent metal coagulant. Coloring may also be achieved by causing the hetero aggregation while involving the colorant of the invention and an optional colorant other than the colorant of the invention.

The toner of the present embodiment can serve as a one-component developer or be blended with a carrier to provide a two-component developer. The carrier is exemplified by known magnetite, ferrite or iron powder.

As described, since the colorant of the present invention has a broad absorption band in the visible region and exhibits excellent blackness (i.e., sufficiently high optical density and sufficiently low saturation), the toner of the present embodiment is suitable as a black toner. In general, a toner has a colorant content of 3% to 10% by mass based on the binder resin thereof. The black toner comprising the toner of the present embodiment is superior in visibility to CYM composite black even with the colorant content falling within that range. In this case, the colorant of the invention enables production of a black toner that is of non- or low-carbon black type and yet sufficiently excellent in color density as well as charging characteristics.

EXAMPLES

The present invention will now be illustrated in greater detail with reference to Examples, but it should be noted that the invention is not construed as being limited thereto.

Preparation of Crude Crystals of Compound (1):

The compound (1), i.e., 1-(3,5-dimethylpyrrol-2-yl)-3-(3,5-dimethylpyrrolium-2-ylidene)-cyclobuten-2-one-4-olate was synthesized in accordance with the process taught in *Angewandte Chemie International Edition in English*, Vol. 4, Issue 8, (1965), p. 694. Specifically, 0.63 g (5.2 mmol) of squaric acid (i.e., 3,4-dihydroxy-3-cyclobutene-1,2-dione, available from Kyowa Hakko Kogyo Co., Ltd.) and 1 g (10.5 mmol) of 2,4-dimethylpyrrole (D2848 by Tokyo Kasei Kogyo Co., Ltd.) were dissolved in 50 ml of ethanol, and the solution was azeotropically refluxed for 7 hours. The precipitate thus formed was collected by filtration and washed with ethanol and water to obtain crude crystals, which were recrystallized from ethanol to obtain a purified product in a yield of 75%.

Preparation of Crystals A:

In 40 ml of THF was dissolved 50 mg of the purified product prepared above. The solution was poured into 2 liters of water as a poor solvent to induce Recrystallization. The resulting crystals of the compound (1) are designated crystals A.

Example 1

In a ball mill container were put 100 mg of the purified product prepared above, 1 ml of IPA, and 10 g of 1 mm diameter zirconia beads and milled in a planetary ball mill (P-7, available from Fritsch Japan) at 600 rpm and 25° to 60° C. for 1 hour. Water was put into the ball mill container, and the mixture was passed through a 50 nm filter to collect crystals of the compound (1), designated crystals C.

Crystals C were analyzed by powder X-ray diffractometry using an X ray diffractometer (D8 DISCOVER, from Bruker AXS), Cu target, λ=1.5405 Å. The resulting powder X ray diffraction spectrum is shown in FIG. 1. Crystals A were similarly analyzed to give the spectrum shown in FIG. 1.

Crystals C show main peaks at interplanar spacings d of 3.5 Å, 3.63 Å, 4.23 Å, 6.65 Å, and 7.84 Å, while crystals A at d=3.25 Å, 3.46 Å, 3.77 Å, 5.10 Å, and 7.84 Å. These results reveal that crystals C and crystals A have different crystal forms.

Example 2

In a ball mill container were put 100 mg of the purified product prepared above, 1 ml of THF, and 10 g of 1 mm diameter zirconia beads and milled in a planetary ball mill (P-7, from Fritsch Japan) at 600 rpm and 25° to 60° C. for 1 hour. Water was put into the ball mill container, and the mixture was passed through a 50 nm filter to collect crystals of the compound (1), designated crystals D.

Figure 2:
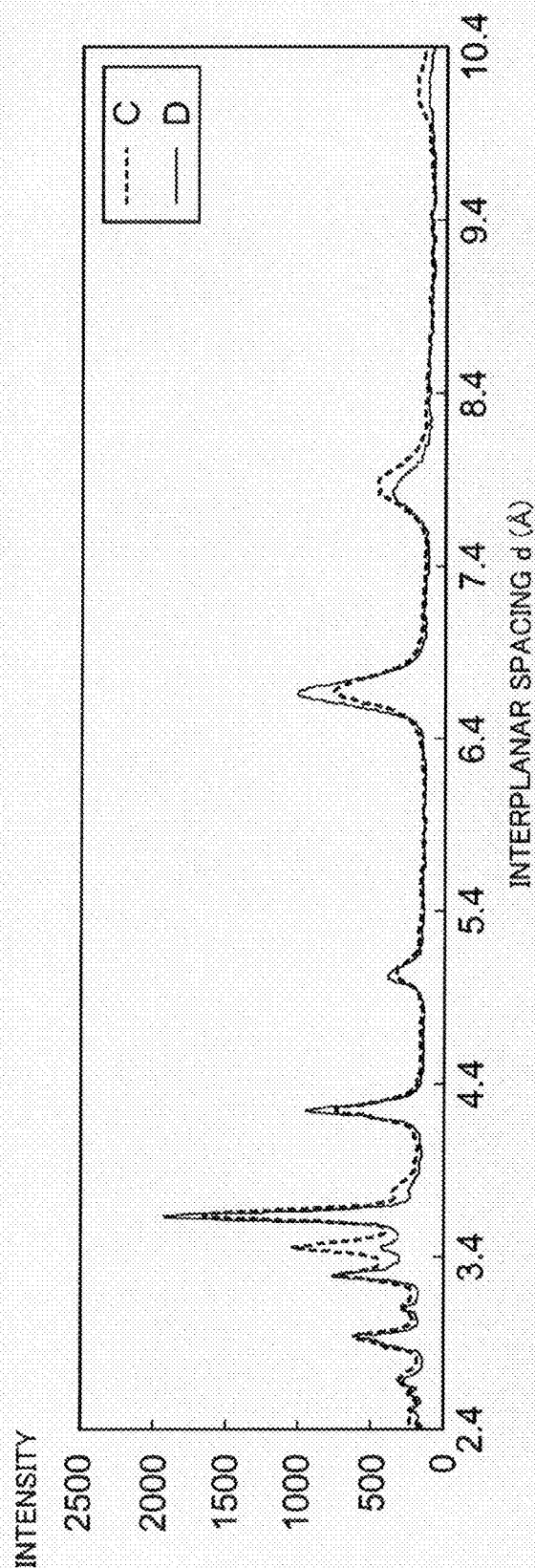
FIG. 2 is the powder X-ray diffraction spectra of crystals C and D.

Crystals D were analyzed by powder X-ray diffractometry in the same manner as in Example 1. The resulting powder X ray diffraction spectrum is shown in FIG. 2, in which the spectrum of crystals C are also shown for easy comparison.

The powder X-ray diffraction pattern of crystals D displays main peaks at interplanar spacings d of 3.45 Å, 3.63 Å, 4.23 Å, 6.65 Å, 7.84 Å, proving that crystal D to have the same crystal phase as crystal C, provided that differences of relative intensities of the main peaks were observed as shown in Table 1 below. Specifically, crystal C has a relative peak intensity ratio $I_{4.23}/I_{3.45}$ (the ratio of the peak intensity at an interplanar spacing d=4.23 Å to that at d=3.45) of smaller than 1.0, whilst crystal D has $I_{4.23}/I_{3.45}$ of 1.0 or greater and shows greater progress of growth of the crystal plane having a spacing d of 4.23 Å.

TABLE 1

| Interplanar | Relative Intensity (%) | |
|---|---|---|
| Spacing d (Å) | Crystal C | Crystal D |
| 3.45 | 63 | 22 |
| 3.63 | 100 | 100 |
| 4.23 | 44 | 35 |
| 6.65 | 44 | 52 |
| 7.84 | 28 | 19 |

Figure 3:
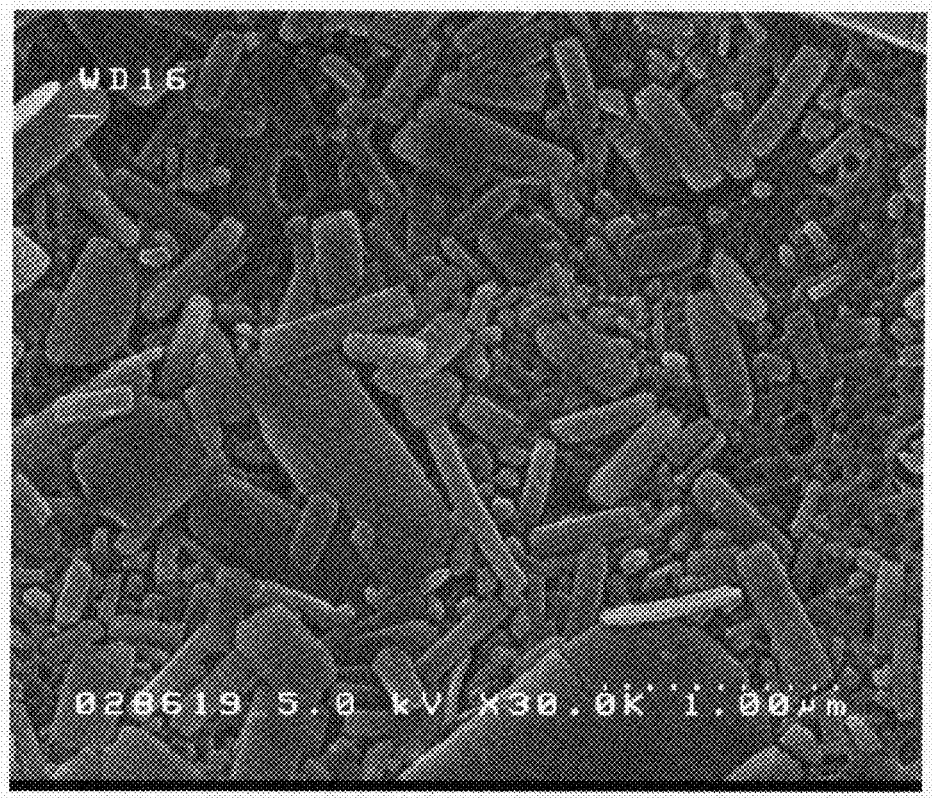
FIG. 3 is an SEM micrograph of crystals C obtained in Example 1.
Figure 4:
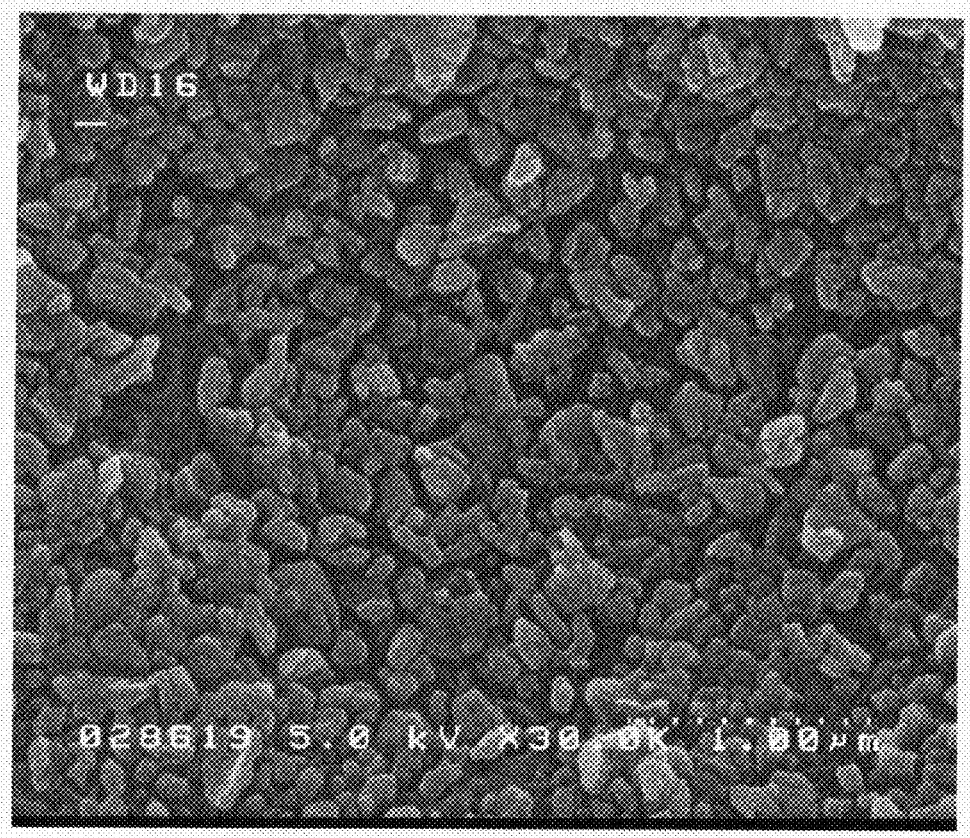
FIG. 4 is an SEM micrograph of crystals D obtained in Example 2.

SEM Observation of Crystals:

The crystals C and D were observed under a scanning electron microscope (SEM). FIG. 3 is an SEM micrograph of crystals C obtained in Example 1. FIG. 4 is an SEM micrograph of crystals D obtained in Example 2. As can be seen from the micrographs, crystals C are platy, showing great growth in other than a specific planar direction, while crystals D reveal isotropic growth. The reason for the crystals C having $I_{4.23}/I_{3.45}$ less than 1.0 is that the specific planar direction referred to above is the plane of d=4.23 Å and that the growth in other than the specific planar direction is greater so that the relative intensity of the peak at d=4.23 Å is smaller. The reason for the crystals D having $I_{4.23}/I_{3.45}$ of 1.0 or greater is that the isotropic growth results in a greater relative intensity of the peak at d=4.23 Å.

Table 2 shows the treatment given to the purified product in the preparation of crystals A, C, and D, the solvent used in the milling, and the crystal phase and median diameter of the crystals. Separately, the fine particles of crystals A, C, or D were dispersed in water, and the resulting slurry was dropped on paper and dried. The color of the dried particles is shown in Table 2.

TABLE 2

|  | Crystal A | Crystal C | Crystal D |
|---|---|---|---|
| Crystal Phase | (I) | (III) | (III) |
| Color of Particle | reddish purple | brown | blue |
| Treatment of Purified Product | Recrystallization from THF | milling with IPA | milling with THF |
| Median Diameter d50 (nm) | 200 | 180 | 80 |
| Solvent used for Milling | THF | IPA | THF |

Preparation of Slurry:

(a) Slurry of Crystals A

Fine particles of crystals A obtained above (4.8 mg), 15 μl of a 12 mass % aqueous solution of a dispersant (Triton X-100, from Nacalai Tesque, Inc.), and 2.9 ml of distilled water were mixed and dispersed in an ultrasonic homogenizer (VC-130, from Sonics & Materials, Inc.; ultrasonic output: 4-5 W; fitted with a ¼ in. horn; irradiation time: 30 minutes) to prepare a slurry. The colorant concentration in the slurry was 0.165 mass %.

The crystal grain size in the slurry was measured with a particle size analyzer (Microtrack UPA9230, from Nikkiso Co., Ltd.). As a result, the median diameter d50 of the crystal grains was found to be 200 nm.

(b) Slurry of Crystals C

Fine particles of crystals C obtained in Example 1 (4.8 mg), 15 μl of a 12 mass % aqueous solution of a dispersant (Triton X-100, from Nacalai Tesque, Inc.), and 2.9 ml of distilled water were mixed and dispersed in an ultrasonic homogenizer (VC-130, from Sonics & Materials, Inc.; ultrasonic output: 4-5 W; fitted with a ¼ in. horn; irradiation time: 30 minutes) to prepare a slurry. The colorant concentration in the slurry was 0.165 mass %.

The crystal grain size in the slurry was measured with a particle size analyzer (Microtrack UPA9230, from Nikkiso Co., Ltd.). As a result, the median diameter d50 of the crystal grains was found to be 180 nm.

(c) Slurry of Crystals D

Fine particles of crystals D obtained in Example 2 (4.8 mg), 15 μl of a 12 mass % aqueous solution of a dispersant (Triton X-100, from Nacalai Tesque, Inc.), and 2.9 ml of distilled water were mixed and dispersed in an ultrasonic homogenizer (VC-130, from Sonics & Materials, Inc.; ultrasonic output: 4-5 W; fitted with a ¼ in. horn; irradiation time: 30 minutes) to prepare a slurry. The colorant concentration in the slurry was 0.165 mass %.

The crystal grain size in the slurry was measured with a particle size analyzer (Microtrack UPA9230, from Nikkiso Co., Ltd.). As a result, the median diameter d50 of the crystal grains was found to be 80 nm.

Evaluation of Colorants:

Samples for evaluation were made according to the following procedure simulating manufacture of a toner using a colorant containing crystals A, C or D prepared above. The samples were evaluated for blackness and measured for optical density, saturation, and reflection spectrum.

Preparation of Samples for Evaluation:

An emulsion polymerization resin obtained from styrene, n-butyl acrylate, and acrylic acid in the presence of a surface active agent was dispersed in water in a concentration of 40 mass % to prepare an aqueous styrene acrylic resin latex dispersion. A mixture of 37 μl of the crystal A, C or D slurry prepared above and 15 μl of the latex dispersion was dispersed in Ultra-Turrax (from IKA Japan) to prepare a mixed slurry. To the slurry was further added poly (aluminum chloride) (PAC) as a coagulant, followed by mixing by stirring to prepare a simulated toner dispersion.

On filter paper (GSWPO 4700, from Millipore; pore size: 220 nm) was put 3822 μl of the simulated toner dispersion, dried in air, and pressed at 120° C. to form a resin film on the filter paper, which was used as a sample for evaluation. The sample corresponds to a solid image printed with a toner made from a colorant and a binder resin. The amounts of the colorant and the styrene acrylic resin latex in the mixed slurry were adjusted so that the total mass per unit area (TMA), i.e., sum (solids content) of the colorant (crystals A, C, or D) and the styrene acrylic resin latex, might be 4.5 g/m² and that the pigment mass per unit area (PMA) might be 0.045 g/m², equivalent to 1 mass % of the resin.

Evaluation of Blackness:

The sample for evaluation was evaluated for blackness with the naked eye in comparison with samples prepared in the same manner but using each of carbon black, CMY composite black, and perylene black as a colorant. The comparison showed the following descending order of blackness: carbon black>crystals D>crystals C>crystals A>CMY composite black>perylene black. The detailed results of evaluation were as follows.

The crystal D sample was slightly bluish as compared with the carbon black sample but perceived as black when viewed alone. The crystal C sample was slightly reddish as compared with the carbon black sample but virtually perceived as black when viewed alone. The crystal A sample was more reddish than the crystal C sample but virtually perceived as black when viewed alone. The CYM composite black sample was perceived as close to ultramarine rather than black even when viewed alone. The perylene black sample was perceived as ultramarine even when viewed alone.

Measurement of Optical Density:

The optical density (OD) of each sample for evaluation was measured with a reflection densitometer (X-Rite 939, from X-Rite Inc.). The results obtained are shown in Table 3. Generally known optical densities of CYM composite black and perylene black are also shown in the table.

Measurement of Saturation:

The a* and b* values in the L*a*b* color space of each sample for evaluation were measured with a reflection densitometer X-Rite 939, and a saturation c* was calculated therefrom according to equation:

$$c^* = \sqrt{(a^*)^2 + (b^*)^2}$$

The results are shown in Table 3 together with generally known saturation c* values of CYM composite black and perylene black.

TABLE 3

| Colorant | OD | Saturation (c* Value) |
| --- | --- | --- |
| Crystal A | 1.51 | 38.4 |
| Crystal C | 1.49 | 35.7 |
| Crystal D | 1.50 | 26.5 |
| CMY Composite Black | 1.3* | 12* |
| Perylene Black | 1.2* | 24* |

*Generally known data.

The results indicate that, although the saturation values (c* value) of crystals A, C, and D (while not measured but calculated) are higher than those of CYM black and perylene black, the samples for evaluation were rated blacker than the CYM composite black and perylene black samples. The inventors consider that this can be accounted for as follows. Factors causing a human eye to perceive blackness include saturation and optical density. Generally speaking, black becomes blacker as the saturation reduces and as the optical density increases. If the optical density exceeds a certain value, for example, about 1.3, the saturation becomes less perceptible to the human eye. Therefore, even if the saturation slightly increases, blackness is sufficiently perceptible to the human eye as long as the optical density is high enough. This is most likely the reason why crystals A, C, and D were perceived as blacker than CMY composite black or perylene black by the human eye. The reason the CYM composite black or the perylene black was perceived as ultramarine, the inventors believe, is the color essential to the colorant was perceived because of its low optical density.

Figure 5:
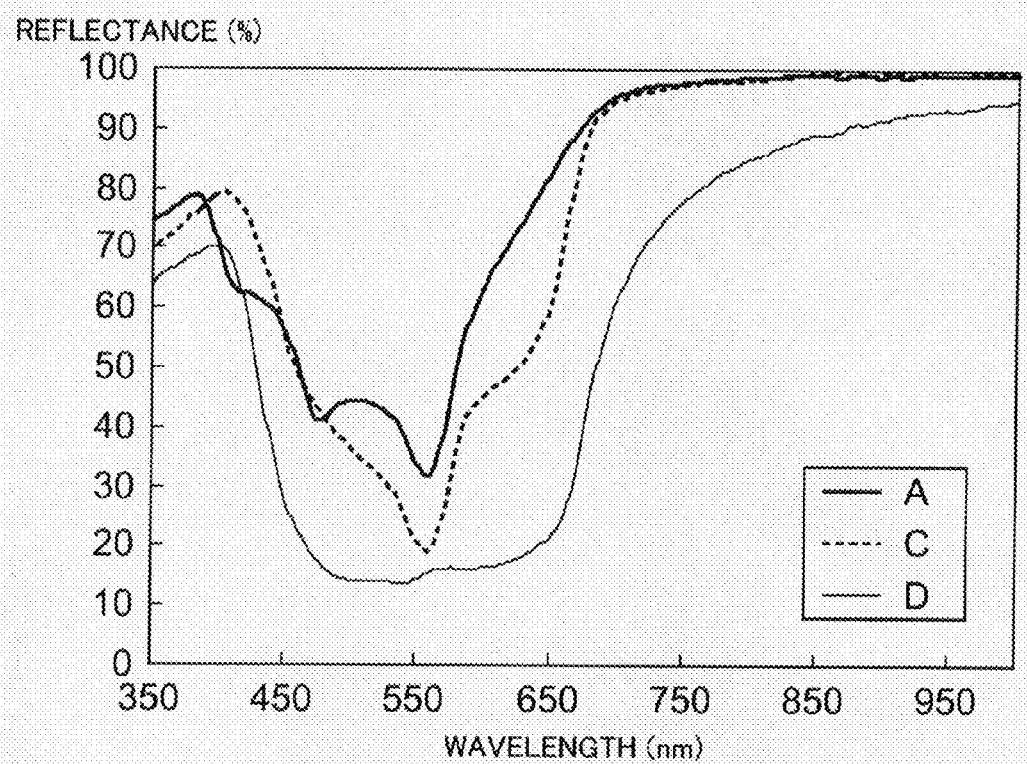
FIG. 5 shows reflection spectra of resin films each having a colorant (crystals A, C or D) provided on paper.

Measurement of Reflection Spectrum:

The reflection spectrum of each sample for evaluation was measured with a spectrophotometer (U-4100, from Hitachi, Ltd.). The resulting reflection spectra are shown in FIG. 5. The reflection spectra represent how a black toner containing each colorant looks. As shown in FIG. 5, the samples using crystals C of Example 1 and the sample using crystals D of Example 2 have a small reflectance in the visible region and therefore look black to the human eye and, on the other hand, have a large reflectance in the near infrared region (800 nm and longer wavelengths), i.e., show small absorption of near infrared light. This indicates near infrared transmissivity of the resin film.

As shown in FIG. 5, crystals C and D have a smaller reflectance than crystals A in the wavelength region exceeding 560 nm. This reveals that the compound (1) exhibits different visible light absorption characteristics according to the form of crystal structure. Furthermore, crystals C and D exhibit improved blackness than crystal A as shown in Table 3, which proves that the difference in crystal form influences the color shade.

Comparing crystals C and D, crystal D has a lower reflectance than crystal C in both the shorter and the longer wavelength sides of 560 nm. This proves that crystals of the same crystal phase show different visible light absorption characteristics according to the crystal form. Additionally, crystal D exhibits further improved blackness over crystal C as shown in Table 3, which proves that the difference in crystal form influences the color shade.

While the crystals of the compound (1) have absorption in the visible region, the absorption wavelength range varies from face to face of a crystal grain. The reason for the superior blackness of crystal D to that of crystal C, the inventors believe, is that crystal D is the result of moderate growth of each face so that high absorption is obtained over the whole visible region. That is, crystals C and D differ in relative intensities of the main peaks in their powder X ray diffraction spectra as shown in Table 1 and in crystal shape as can be seen from their SEM micrographs (FIGS. 3 and 4). Crystal C strongly absorbs light around 550 nm but tends to have decreased absorption in the wavelength regions shorter and longer than 550 nm probably because crystal C having $I_{4.23}/I_{3.45}$ of 0.7 has a plate shape, which is the result of growth in other than the direction parallel to the planes having an interplanar spacing d of 4.23 Å. On the other hand, it is considered that crystal D having $I_{4.23}/I_{3.45}$ of 1.6 has a crystal form resulting from isotropic growth so that it has absorbing faces that increase blackness (particularly the crystal face capable of absorbing light in the wavelength regions shorter and longer than about 550 nm) to a sufficient extent. The fact that crystal D has a smaller grain size than crystal C also seems contributory to the improvement of blackness by virtue of increased optical density.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A colorant comprising a crystal of a compound represented by the following formula (1):

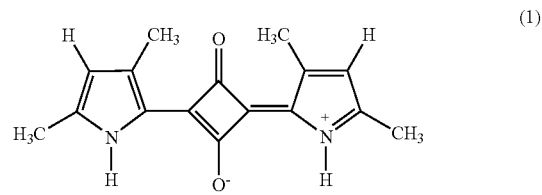

the crystal having a crystal form showing main peaks at interplanar spacings d of 3.45±0.5 Å, 3.63±0.5 Å, 4.23±0.5 Å, 6.65±0.5 Å, and 7.84±0.5 Å in powder X-ray diffraction pattern with CuKα radiation.

2. The colorant according to claim 1, wherein the crystal has a ratio of the peak intensity at an interplanar spacing d of 4.23±0.5 Å to that at d of 3.45±0.5 Å of 1.0 or greater in powder X ray diffraction pattern with CuKα radiation.

3. The colorant according to claim 1, which is used in an image forming material.

* * * * *